US007533117B2

(12) United States Patent
de Lara et al.

(10) Patent No.: US 7,533,117 B2
(45) Date of Patent: May 12, 2009

(54) COMPONENT-BASED ADAPTATION SYSTEM AND METHOD

(75) Inventors: Eyal de Lara, Houston, TX (US); Daniel S. Wallach, Houston, TX (US); Willy Zwaenepoel, Houston, TX (US)

(73) Assignee: William Marsh Rice University, Houston, TX (US)

( * ) Notice: Subject to any disclaimer, the term of this patent is extended or adjusted under 35 U.S.C. 154(b) by 1054 days.

(21) Appl. No.: 10/914,611

(22) Filed: Aug. 9, 2004

(65) Prior Publication Data

US 2005/0125462 A1 Jun. 9, 2005

Related U.S. Application Data

(63) Continuation of application No. 09/736,477, filed on Dec. 13, 2000, now Pat. No. 6,775,671.

(51) Int. Cl.
*G06F 17/30* (2006.01)
(52) U.S. Cl. .................................. 707/102; 707/10
(58) Field of Classification Search ................ 707/1, 707/10, 100–102, 203; 715/236, 511, 761; 704/276
See application file for complete search history.

(56) References Cited

U.S. PATENT DOCUMENTS

| | | | | |
|---|---|---|---|---|
| 4,882,727 A | 11/1989 | Williams et al. | ............... | 370/79 |
| 5,423,003 A | 6/1995 | Berteau | ............... | 395/200 |
| 5,546,577 A | 8/1996 | Marlin et al. | ............... | 395/600 |
| 5,680,615 A | 10/1997 | Marlin et al. | ............... | 395/614 |
| 5,758,074 A | 5/1998 | Marlin et al. | ............... | 395/200.8 |
| 5,778,377 A | 7/1998 | Marlin et al. | ............... | 707/103 |
| 5,867,714 A | 2/1999 | Todd et al. | ............... | 395/712 |
| 5,926,636 A | 7/1999 | Lam et al. | ............... | 395/683 |
| 5,961,599 A | 10/1999 | Kalavade et al. | ............... | 709/224 |
| 5,968,116 A | 10/1999 | Day, II et al. | ............... | 709/202 |

(Continued)

OTHER PUBLICATIONS

Katz, "Adaptation and Mobility in Wireless Information Systems," *IEEE Personal Communications*, First Quarter 1994, pp. 6-17.

(Continued)

*Primary Examiner*—Diane Mizrahi
(74) *Attorney, Agent, or Firm*—Baker Botts L.L.P.

(57) ABSTRACT

A component-based adaptation system is provided in which the operation of an application or the data being used by the application is adapted according to an application-specific or a user-specific policy. Following a request for a document by an application, the requested document is retrieved and converted into an application-independent format. The data of the document is then supplied to the application according to a user-specific or application-specific policy. The application of the policy may result in a lower fidelity version or a subset of the data of the requested document being supplied to the application. The policy may also govern the updating of the data supplied to the application. The data supplied to the application may be updated following the occurrence of a tracked event in the application or according to a background policy governing the supply of updated data without reference to the user's operation of the application. All of the adaptations are implemented without modifying the source code of the application and without modifying the document as it is permanently stored on a data server.

7 Claims, 6 Drawing Sheets

U.S. PATENT DOCUMENTS

| | | | | |
|---|---|---|---|---|
| 5,983,190 | A | * | 11/1999 | Trower et al. ............... 704/276 |
| 5,991,806 | A | | 11/1999 | McHann, Jr. ................ 709/224 |
| 6,012,100 | A | | 1/2000 | Frailong et al. ............. 709/250 |
| 6,021,445 | A | | 2/2000 | Chapa ........................ 709/302 |
| 6,026,354 | A | | 2/2000 | Singh et al. ................. 702/186 |
| 6,038,611 | A | | 3/2000 | Masel ........................ 709/302 |
| 6,044,408 | A | | 3/2000 | Engstrom et al. ........... 709/302 |
| 6,052,727 | A | | 4/2000 | Kamalanathan ............. 709/224 |
| 6,055,562 | A | | 4/2000 | Devarakonda et al. ...... 709/202 |
| 6,349,357 | B1 | | 2/2002 | Chong, Jr. ................... 711/111 |
| 6,397,259 | B1 | | 5/2002 | Lincke et al. ............... 709/236 |
| 6,400,157 | B1 | | 6/2002 | Bonanni et al. ............. 324/322 |
| 6,442,611 | B1 | | 8/2002 | Navarre et al. .............. 285/300 |
| 6,678,788 | B1 | * | 1/2004 | O'Connell .................. 711/114 |
| 7,085,999 | B2 | * | 8/2006 | Maeda et al. ............... 715/236 |
| 2003/0191769 | A1 | * | 10/2003 | Crisan et al. ................ 707/100 |
| 2004/0153710 | A1 | * | 8/2004 | Fair ............................. 714/4 |
| 2008/0178097 | A1 | * | 7/2008 | Lejeune ...................... 715/761 |

OTHER PUBLICATIONS

Fox et al., "Adapting to Network and Client Variability via On-Demand Dynamic Distillation," University of California at Berkeley, pp. 1-11.

Fox et al., "Adapting to Network and Client Variation Using Infrastructural Proxies: Lessons and Perspectives," University of California at Berkeley, 15 pp. (unnumbered).

Noble et al., "Agile Application-Aware Adaptation for Mobility," to appear in the *Proceedings of the 16th ACM Symposium on Operating System Principles*, School of Computer Science, Carnegie Mellon University, 12 pp. (unnumbered).

Joseph et al., "Building Reliable Mobile-Aware Applications using the Rover Toolkit," appears in *Proceedings of the 2nd ACM International Conference on Mobile Computing and Networking*, Nov. 1996, 13 pp. (unnumbered).

Forman et al., "The Challenges of Mobile Computing," University of Washington, available as UW CSE Tech Report # 93-11-03 from ftp.cs.washington.edu (16 pp). An edited version of this paper has been accepted for publication in *IEEE Computer*. 1993.

Cunha et al., "Characteristics of WWW Client-based Traces," Computer Science Department, Boston University, BU-CS-95-010, Jul. 18, 1995, 18 pp.

Kistler et al., "Disconnected Operation in the Coda File System," *ACM Transactions on Computer Systems*, vol. 10, No. 1, Feb. 1992, pp. 3-25.

Kaashoek et al., "Dynamic Documents: Mobile Wireless Access to the WWW," MIT Laboratory for Computer Science, to appear in *Proceedings of the IEEE Workshop on Mobile Computing Systems and Applications*, Santa Cruz, CA, Dec. 1994, 6 pp.

Mummert et al., "Exploiting Weak Connectivity for Mobile File Access," Carnegie Mellon University, SIGOPS '95 Dec. 1995 CO, USA, pp. 143-155.

Myers et al., "Extending the Windows Desktop Interface With Connected Handheld Computers," Human Computer Interaction Institute, School of Computer Science, Carnegie Mellon University, submitted for publication, pp. 1-10.

Satyanarayanan, "Fundamental Challenges in Mobile Computing," School of Computer Science, Carnegie Mellon University, 7 pp.

Duchamp, "Issues in Wireless Mobile Computing," Computer Science Department, Columbia University, 7 pp. (unnumbered).

de Lara et al., "Opportunities for Bandwidth Adaptation in Microsoft Office Documents," Department of Electrical and Computer Engineering, Department of Computer Science, Rice University, 12 pp. (unnumbered).

de Lara et al., "Puppeteer: Component-based Adaptation for Mobile Computing," Department of Electrical and Computer Engineering, Department of Computer Science, Rice University, 12 pp.

Noble et al., "A Research Status Report on Adaptation for Mobile Data Access," School of Computer Science, Carnegie Mellon University, 6 pp. (unnumbered).

Joseph et al., "Rover: A toolkit for Mobile Information Access," appears in Proceedings of the Fifteenth Symposium on Operating Systems Principles, Dec. 1995, 16 pp.

Andersen et al., "System Support for Bandwidth Management and Content Adaptation in Internet Applications," M.I.T. Laboratory for Computer Science, 14 pp. (unnumbered).

Bagrodia et al., "Vision, Issues, and Architecture for Nomadic Computing," 27 pp.

Satyanarayanan et al., "Visual Proxy: Exploiting OS Customizations without Application Source Code," School of Computer Science, Carnegie Mellon University, 5 pp.

Katz, "Adaptation and Mobility in Wireless Information Systems," *IEEE Personal Communications*, First Quarter 1994, pp. 6-17.

Joseph et al., "Building Reliable Mobile-Aware Applications using the Rover Toolkit," appears in *Proceedings of the 2nd ACM International Conference on Mobile Computing and Networking*, Nov. 1996, 13 pp. (unnumbered).

Forman et al., "The Challenges of Mobile Computing," University of Washington, available as UW CSE Tech Report # 93-11-03 from ftp.cs.washington.edu (16 pp). An edited version of this paper has been accepted for publication in *IEEE Computer*.

Cunha et al., "Characteristics of WWW Client-based Traces," Computer Science Department, Boston University, BU-CS-95-010, Jul. 18, 1995, 18 pp.

Kistler et al., "Disconnected Operation in the Coda File System," *ACM Transactions on Computer Systems*, vol. 10, No. 1, Feb. 1992, pp. 3-25.

Kaashoek et al., "Dynamic Documents: Mobile Wireless Access to the WWW," MIT Laboratory for Computer Science, to appear in *Proceedings of the IEEE Workshop on Mobile Computing Systems and Applications*, Santa Cruz, CA, Dec. 1994, 6 pp.

Mummert et al., "Exploiting Weak Connectivity for Mobile File Access," Carnegie Mellon University, SIGOPS '95 Dec. 1995 CO, USA, pp. 143-155.

Joseph et al., "Rover: A toolkit for Mobile Information Access," appears in Proceedings of the Fifteenth Symposium on Operating Systems Principles, Dec. 1995, 16 pp.

* cited by examiner

COMPONENT-BASED ADAPTATION SYSTEM AND METHOD

CROSS-REFERENCE TO RELATED APPLICATIONS

This application is a continuation of U.S. application Ser. No. 09/736,477, filed Dec. 13, 2000, which issued as U.S. Pat. No. 6,775,671.

TECHNICAL FIELD OF THE INVENTION

The present invention relates in general to the field of computing in resource-poor environments, such as mobile and wireless computing systems, and, more particularly, to a method for the adaptation of component-based application programs.

BACKGROUND OF THE INVENTION

A user's computing experience is affected by the scarcity or abundance of computer resources. One such resource is network bandwidth in the client-server computing model. The less bandwidth available to the user, the less quickly the user will be able to access data over a communications link or run applications that rely on data transmitted through the communications link. The bandwidth limitation is aggravated in the case of mobile clients, i.e., clients that exist in client-server environments or other environments and that attempt to transmit data through wireless or other non-fixed connections. Further, when applications or data designed for high bandwidth networks is used in bandwidth-limited networks, the computing environment of a user at a client computer, including mobile client computers, can become extremely slow. For mobile clients that rely on standalone battery power, the time consumed by receiving a file over a bandwidth-limited network also consumes computing time that could be spent on other tasks.

Adaptation is the manipulation of the operation of an application or the alteration of data that is being used by or transmitted to or from an application. The two fundamental kinds of adaptation are control adaptation, such as when the operation of an application is manipulated, and data adaptation, which occurs when the data of application is adapted. A common example of control adaptation occurs when control is returned to the user after only a subset of the requested data is loaded by the application, even though the normal behavior of the application would require that all of the data be loaded before control is returned to the user. A common example of data adaptation occurs when the content of a data element is altered to improve the latency effect of computing with the data in mobile computing or client-server computing environments. Many adaptation schemes involve a change to both the behavior of an application and the data of the application. Known control adaptation schemes often involved customized applications designed to be adaptable by the user, or the use of standard applications together with specialized operating systems or applications that adapt the content of data used by the applications, or combinations thereof.

Application programs may be logically organized to include several sub-applications or components. Each component of the application may perform a specialized function. As an example, an office productivity application may include a word processing component, a spreadsheet component, and an image presentation component. Although each of the components can exist separately as its own application, in this example, each of the components is a subset of a larger application. The integration of components into a larger application is made possible by the inclusion in each component of a known application programming interface (API). The use of an open API allows an application to be constructed from several individual components from several sources. In addition to APIs that allow the embedding of a document of one component within a document of another component, an application may also include an automation or scripting API that permits one component to control the behavior of another component.

Examples of component-based applications include the Microsoft Office Suite, MICROSOFT INTERNET EXPLORER, AOL's NETSCAPE COMMUNICATOR, KDE Office Suite, and Star Office. Although traditionally associated with the Windows platform and with Component Object Model/Distributed Component Object Model COM/OLE technology, component-based technologies are becoming more common in the UNIX world as well, where the push for component-based technologies is being led by the GNOME and KDE projects. These open source initiatives strive to enable the development of applications that allow the seamless integration of components that have a consistent look-and-feel. An example is KOffice, an open source productivity suite with powerful scripting capabilities. More recently, StarOffice released a version of its cross-platform productivity suite that implements a sophisticated object model that allows scripting by third-party applications through a CORBA-based interface.

A file generated by a component-based application is often a compound file, containing elements created by several of the sub-applications or components. As an example, a compound file could include a spreadsheet, an image, and text. Generally, every data type in a compound file is created and managed by a separate one of the sub-applications or components. These data files may become quite large, and, when communicated in a mobile computing environment or over a client-server network, may contribute to a significant latency effect being experienced by the user. Thus, even though these compound files provide for the accumulation of several different data types within a single file, these documents can be so large that the users experience severe latency effects when requesting the delivery of these files over client-server networks.

SUMMARY OF THE INVENTION

The present invention concerns a method for adapting the operation of an application or the data being used by the application. The adaptation process involves the use of a client proxy, associated with the application being adapted, and a server proxy, associated with the data being requested by the application. The client proxy includes a policy element that directs the manner in which the application or data is adapted. Upon issuing a request for a document, the requested document is retrieved by the server proxy and translated into a data structure that is application-independent and represents the data structure of the document and the type, location, and size of the data components of the document. This data structure is transmitted to the server proxy. The policy determines from the data structure the application-specific data components of the data structure that are to be retrieved and supplied to the application.

The data supplied to the application is a variation of the data requested by the application. The variation received by the application can differ from the data requested according to both the version of the data supplied as compared to the version of the data requested and according to a subset of the data supplied as compared to the data requested. The application may be adapted in that it may operate on a lower fidelity version of the data requested or a subset of the data requested. The data of the application may be adapted in that the data may be altered to produce a lower fidelity version of the data requested.

The data of the application may be updated. The updating process may be initiated by the occurrence of a tracked event. If a tracked event occurs, such as the passage of the mouse over an image, the client proxy may request from the server proxy a higher fidelity version of a particular data element. Once received by the client proxy, the higher fidelity image is supplied to the application. The updating process may occur without reference to a tracked event and according to the policy. After the application is provided with a subset of a requested requested, allowing the client proxy to provide the application with the entirety of the document requested.

The present invention is advantageous in that it improves the computing experience for computer users in resource-poor environments. By adapting an application or data, a user with power or bandwidth limitations, for example, can use applications and data written or prepared for a resource-rich environment, despite the inherent limitations of the user's computing environment. Another advantage of the present invention is that it includes both application-independent modules and application-specific modules. As applications are adapted for the techniques of the present inventions, a suite of application-specific processing modules can be created to handle the limitations in the computing experience introduced by the application or the data created for use by the application. Further, the use of application-specific modules permits these modules to be tailored to the specific needs of the computer user. As such, these modules may be as complex as necessary to alleviate the computing resource deficiencies being experienced by the user. Other technical advantages of the present invention will be readily apparent to one skilled in the art from the following figures, descriptions, and claims.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

The present invention concerns a component-based adaptation system and method that applies application-specific adaptation policies to the components of an application in a client-server environment. Component-based adaptation does not require access or modification to the source code of a component, and does not require any modifications to the content of a requested document as that document is stored on a data server. Rather, component-based adaptation uses the exposed APIs of the component applications and manipulates the fidelity or the content of the requested document as that document is passed from the server to the client. In this manner, without modifying the source code of an application component or permanently altering the content of a document, control or data adaptation can be performed, respectively, on an application or the documents that the application is using. Data and control adaptation can be performed simultaneously.

Figure 1:
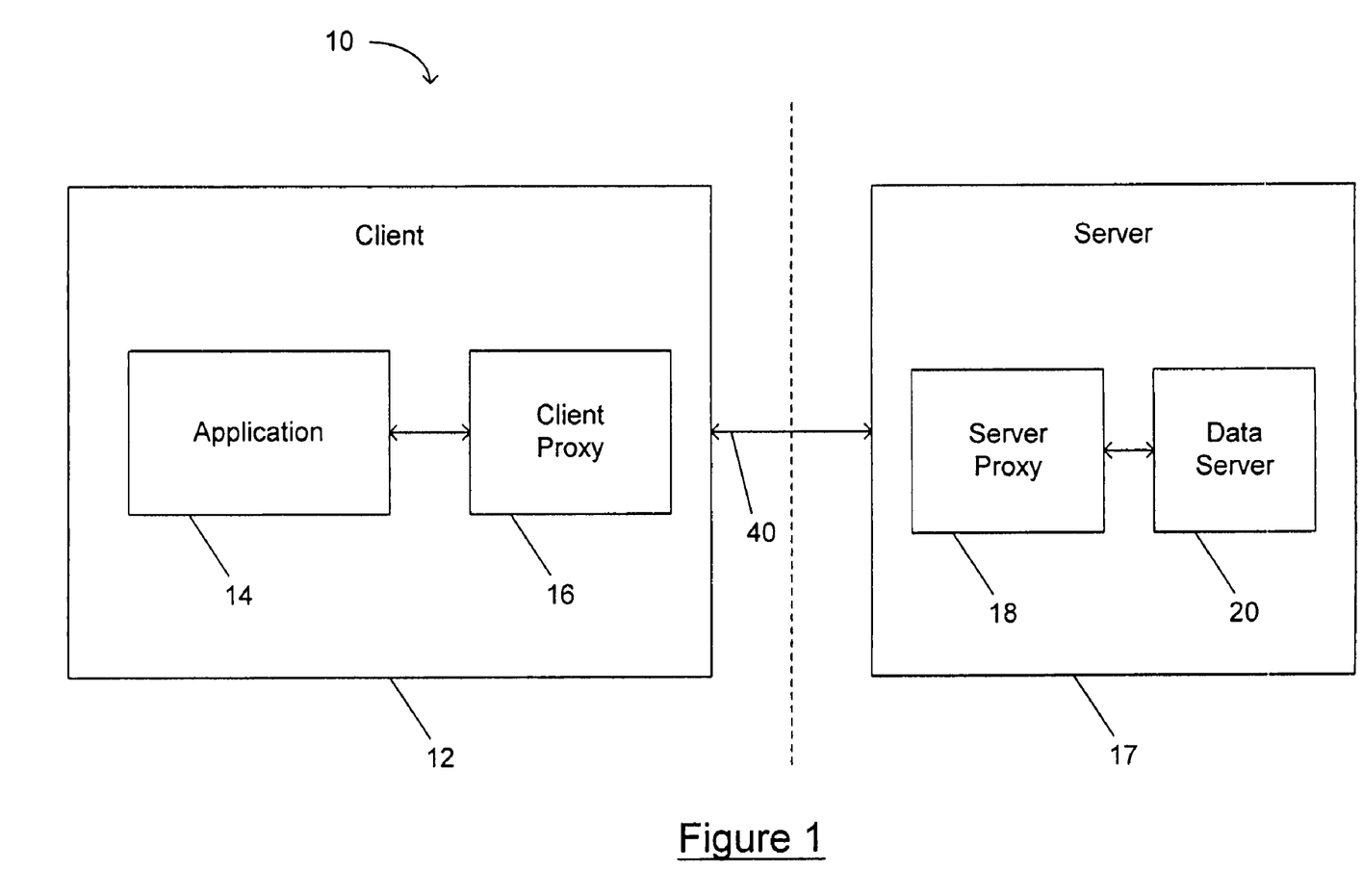
FIG. 1 is a diagram of the elements of the component-based adaptation system in a client-server architecture.

Shown in FIG. 1 is the system architecture 10 of the component-based adaptation system of the present invention. The client machine 12 includes an application 14 and a client proxy 16. The client machine is connected via a communications link 40 to a server machine 17, which includes a server proxy 18 and a data server 20. Application 14 is the component-based application that is adaptable by the process of the present invention. The adaptation of the application 14 is the result of the cooperative work of client proxy 16 and server proxy 18. Client proxy 16 is responsible for executing the adaptation policies that will be applied to application 14. Server proxy 18 has a fast connection to data server 20. In many cases, server proxy 18 executes on the same physical machine as data server 20. Server proxy 18 is responsible for the retrieval of documents from data server 20 in response to commands received from client 12. Data server 20 can be any repository of data, including a web server, a file server, or a database. Throughout this process, even though application 14 may be adapted according to the policies of the client proxy, the source code of application 14 and the content of the data residing on data server 20 are not modified.

Figure 2:
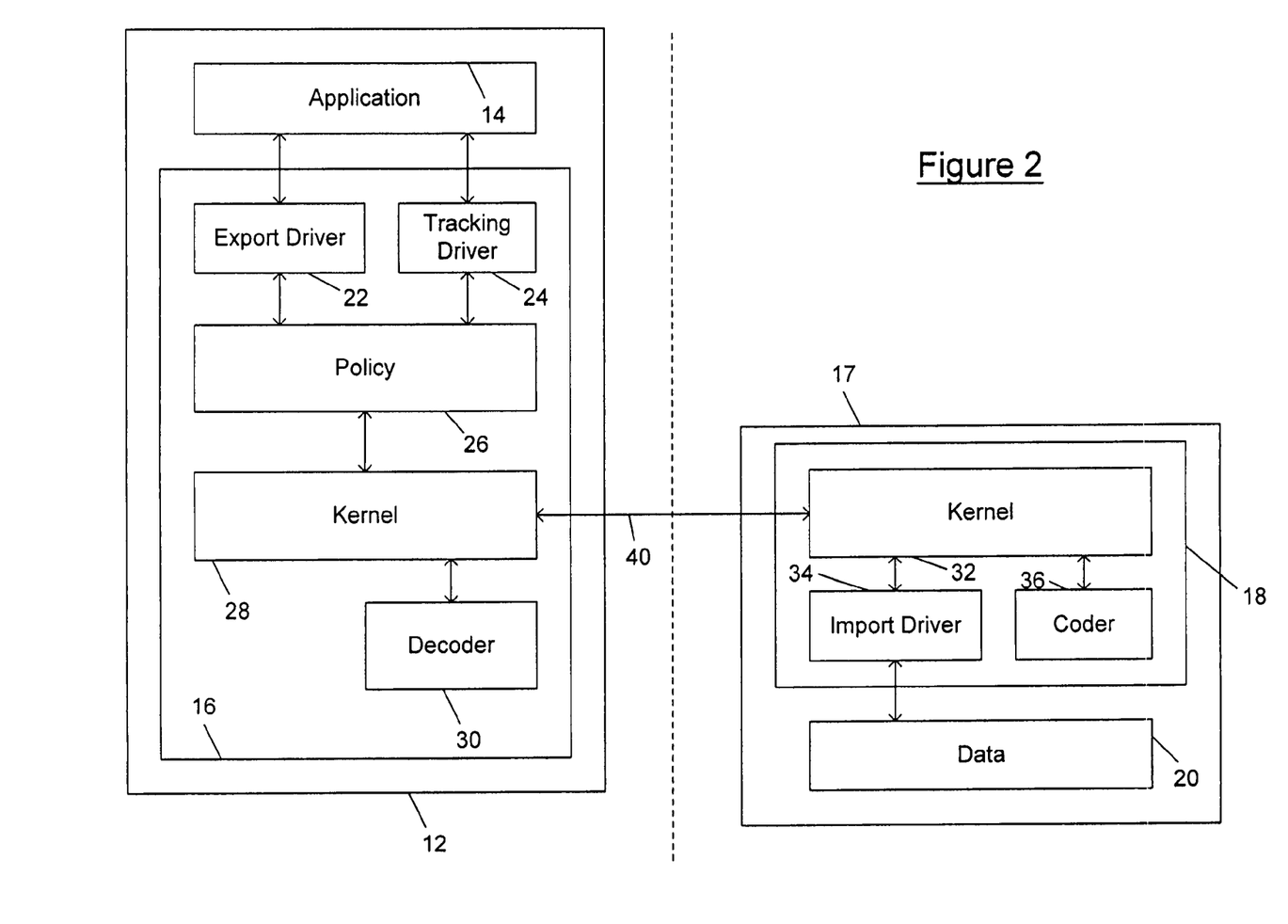
FIG. 2 is a diagram of the architecture of the adaptation system.

Shown in FIG. 2 is a diagram of the logical relationship of the elements of the present invention. Associated with client machine 12 are an application 14 and a number of elements that together comprise the client proxy 16. These elements include an export driver 22, a tracking driver 24, a policy element 26, a client kernel 28, and one or more decoders 30 (only one shown in the figure). On the server side, server machine 17 includes a data server 20 and a server proxy 18. Server proxy 18 includes a server kernel 32, an import driver 34, and one or more coders 36 (only one shown in the figure).

The adaptation method of the present invention can adapt one or more of the components of an application so long as the compound structure of documents of the application can be determined and so long as the components of the application include a run-time interface that allows the run-time modification of the data present internally in the application. A run-time interface of an application component that allows for the manipulation of the data present internally in an application is known as a Data Manipulation Interface (DMI), which is a subset of the API of the application component. The run-time interface or DMI permits the dynamic manipulation of the data that is present internally in the application. As an example, if an application such as a web browser is displaying a page containing an image at a low fidelity level, the presence of a DMI in the web browser allows the replacement of the lower fidelity image with a higher fidelity version of the same image. Thus, the application, through its DMI, allows the alteration through a second external application of the data that is being processed by the application during the time that the application is working on the data.

Client kernel 28 and server kernel 32 are each component-independent modules that facilitate the transfer of document requested by the application 14. Neither kernel has knowledge of the specifics of the component applications or the documents being adapted. Instead, each kernel operates on a description of the documents that is independent of the application components used in generating the document, the description being referred to as Component Independent Format (CIF). The CIF includes the data skeleton of the document, which describes the data structure of the document, and a set of data items. The format of many compound documents (i.e., documents produced by several application components and containing data corresponding to each of those application components) allows them to be easily translated into a tree-like data structure. The data skeleton has the form of a tree, with the root of the tree being the document being retrieved and the children of the tree being the pages, slides, or other individual data components of the document. The data components may be stored in a format that is specific to the application component that generated them. In the case of a document that is nominally a word processing document, the document may contain not only one or more text data components, but also other data components in the form of spreadsheets or images, each possibly in a different format, specific to the application component that generated them.

The data skeleton is a multi-level data structure. A data component at any level of the data skeleton can logically include other data components and the skeleton itself can be arbitrarily complex depending on the complexity of the document itself. Each data component of the skeleton includes native data of the document being retrieved. As an initial step in the process of adapting a document, the document being retrieved is transformed into a data skeleton. The data skeleton data structure does not contain the content of any of the data components of the document. Rather, the data component indicates only the internal data structure of the document, together with an indication of the location, size, and type of the data components within the document. The data skeleton is transferred across communication link 40 to client proxy 16, where the policy element 26 instructs client kernel 28 to retrieve a subset of the data components of the data skeleton, to specify the fidelity level of each data component to be retrieved, or to specify that a particular data transformation be performed on the data components to be retrieved.

A component-specific import driver 34 and export driver 22 is required for each application component that is to be adapted by the adaptation technique described herein. For more complex policies, a tracking driver 24 may also be necessary. Thus, for the present invention to support the adaptation of an application component, client and server drivers must be written specifically for the application, its file format, and its DMI. The present invention is a combination of custom components prepared for each of the application components to be adapted (import driver, export driver, tracking driver) and application-independent component that operate without reference to the application component being adapted or the document being retrieved (client kernel and server kernel).

The function of import driver 34 is to parse the documents retrieved from data server 20, extracting from the documents their compound structure and converting the documents from their application-specific file formats to CIF. When the file format of the document is parseable, either because the file format is human-readable, such as XML, or because sufficient documentation exists to write an application-specific parser, import driver 34 may run directly on server machine 17 to construct the data skeleton of the retrieved document by parsing the document in server proxy 18. Running import driver on server machine 17 in the case of readily parseable document results in efficient throughput in server machine 17.

The static parsing of retrieved documents by import driver 34 is not satisfactory in the case of a dynamic document that includes executable scripts or other embedded data elements that dynamically alter the content of the document. To recognize executable scripts and other dynamic mechanisms within a retrieved document, an import driver for dynamic content runs in client proxy 16 and includes an intercept mechanism that traces dynamic requests back to data elements in the data server 20. These data elements are then fetched through the client and the server kernel and inserted into the application through DMI calls. As a result of this process, both the client and server are aware of the content of the document being retrieved, despite the presence of executable scripts or other embedded data elements in the document.

When the application includes a DMI, but has an opaque file format that is not readily parseable, an instance of the application is run on server proxy 18, allowing the DMI of the application to be used by import driver 34 to uncover the data structure of the retrieved document. In this mode, this instance of the application running on server machine 17 is an aid in completing the parsing function without the necessity of a detailed understanding of the file format of the files of the application being adapted. Using the application itself as a parser may result in a large overhead in the server, however, resulting in a lower overall performance in the server. Moreover, having the application run in the server necessitates that the operating system of the server be the same as the operating system of the client.

Within client proxy 16, export driver 22 unparses the CIF representation and updates the application using the exposed DMI interface of the application. Unparsing is the process of converting CIF to a component specific format. Export driver 22 supports the insertion of newly retrieved data components of the retrieved document into an executing application 14. A tracking driver 24 is necessary for the more complex policies. A tracking driver 24 tracks the data components of the retrieved data file that are being viewed by the user and can intercept load and save requests issued by the user to application 14. Tracking drivers can be implemented through polling or event registration mechanisms. In one example, if a user passes a mouse over an image, this event can be identified by tracking driver 24, which instructs the policy element that a tracked event has occurred. In response, a possible policy may instruct the retrieval of a higher fidelity version of the image to the application.

A transcoder is any element, such as a coder 36 or a decoder 30 that performs a transformation on the data components of the document being retrieved. A transcoder may be conventional in nature, such as the well-known transcoders that compress text and images or reduce image resolution as a means of reducing the size of a document. Because the result of a transcoding operation is a separate or distinct version of a data component, this process is known as versioning. As an example, coder 36 may convert a data component of the document that is an image to a version of the image having a lower fidelity level, thereby reducing the data size of the image. After the lower fidelity image is passed to the client, decoder 30 may decode the image. The decoding step may attempt to return the image to a fidelity level that is the same or nearly the same as the original fidelity level. All coding need not be symmetrical, however. In some environments, it may be desirable for the application to receive a version of the document that is different from the version of the document present on the data server.

Another transcoding mechanism of the present invention is the selection of a subset of the data components of the data skeleton, a technique known as subsetting. Each data component of a data skeleton may be logically related to a number of children of the data component. When loading only a subset of the children of a given data component or node of the CIF, it may be necessary to modify the data component of the parent node to reflect that only a subset of the children of the node were loaded by the import driver as part of a transcoding step being performed on the retrieved document. By selecting only a portion of the data components associated with a parent node of the data skeleton, a temporary data component of the data skeleton is defined and created that includes only a subset of the children nodes of the parent node. A subsetting step need not involve the alteration of the fidelity of a data component. Depending on the policy applied in client proxy 16, a transcoding step may include both a subsetting transcoding step and a versioning transcoding step.

Policy element 26 is included in client proxy 16 and controls the fetching of documents and the fetching of data elements of documents. Upon receiving a data skeleton in response to a document request, policy element 26 transverses the data skeleton passed to it by client kernel 28, determining, in accordance with the policy, both the data components that are to be retrieved and the fidelity of the data components to be retrieved. Policies generally fall into two categories: (a) general purpose policies that are implemented independently of the data component being adapted, an example of which are prefetching policies, and (b) component-specific policies that use the knowledge of the document type being retrieved to control the adaptation (e.g., a policy that retrieves only the first slide of a PowerPoint slide).

A policy may, for example, choose data components and the fidelity level of data components on the basis of available bandwidth, network cost, energy considerations, and any other user-defined preferences. As an example, a user may specify that all text items are to be retrieved and displayed to the user first in an effort to reduce the latency effects experienced by a user. Other policies may attempt to track the user as the user runs the application in an effort to track the user's needs. For example, a policy may require that the kernel fetch the current PowerPoint slide as well as next following three PowerPoint slides. Other policies may attempt to track the user's behavior. For example, if the user only accesses every other page in a document, the policy, recognizing this behavior on the part of the user, may instruct the kernel to cease fetching the unselected pages of the document (as established by the user's selection pattern) and instead fetch every other page or data component of the document being retrieved and run by the application. Because the operation of a policy is user-specific, a policy may be as complex as necessary and have many inputs. Regardless of whether the decision to fetch a component is made by a general purpose policy or a component-specific policy, the actual transcoding and transfer of the data is handled by the client and server kernels, relieving policy element 26 from the intricacies of the transcoding and communication functions. Ultimately, the policy is user-specific and therefore may vary depending on the application, the data being retrieved by the application, and the behavior and preferences of the user.

Figure 3:
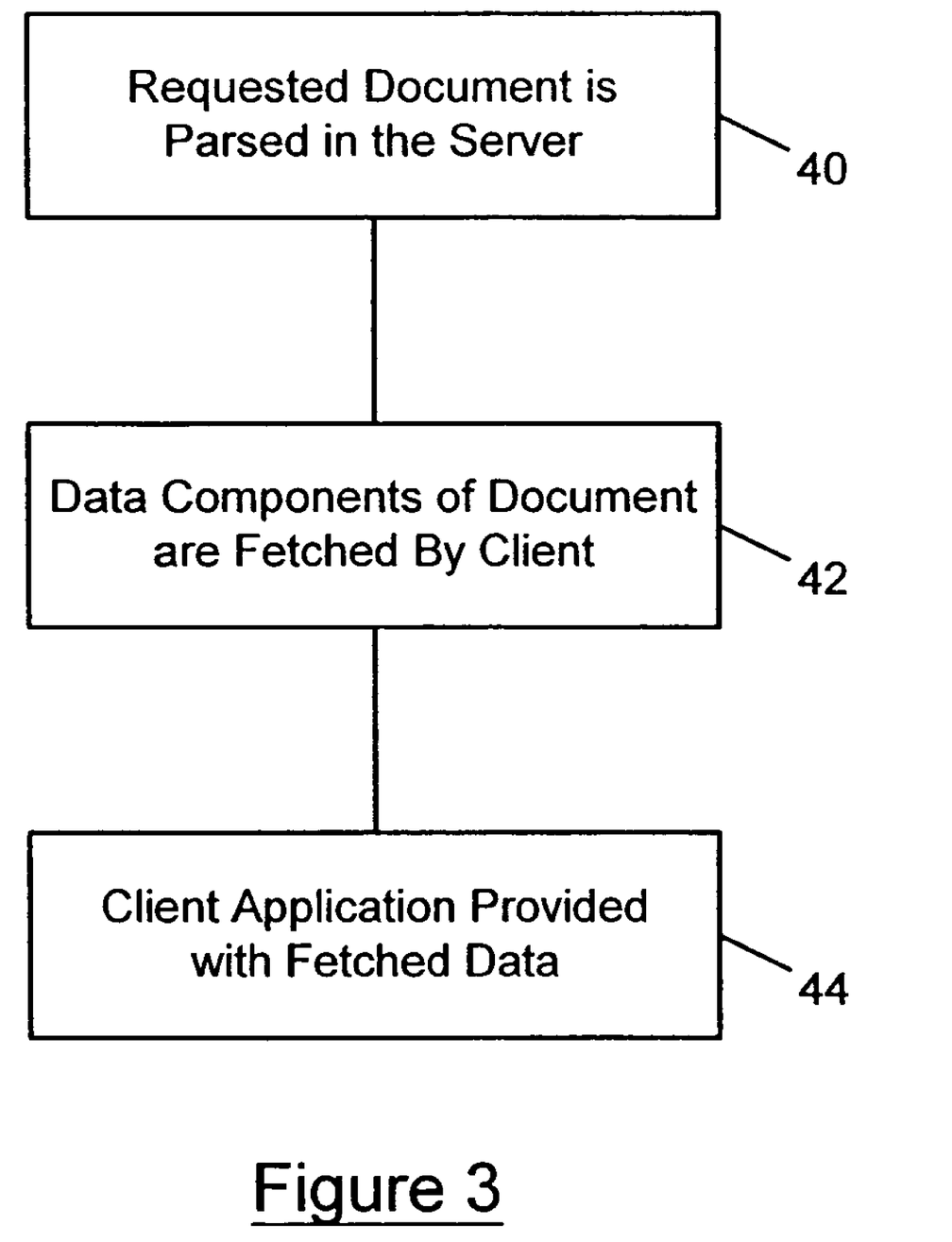
FIG. 3 is a flow diagram of the adaptation steps of the present invention.
Figure 4:
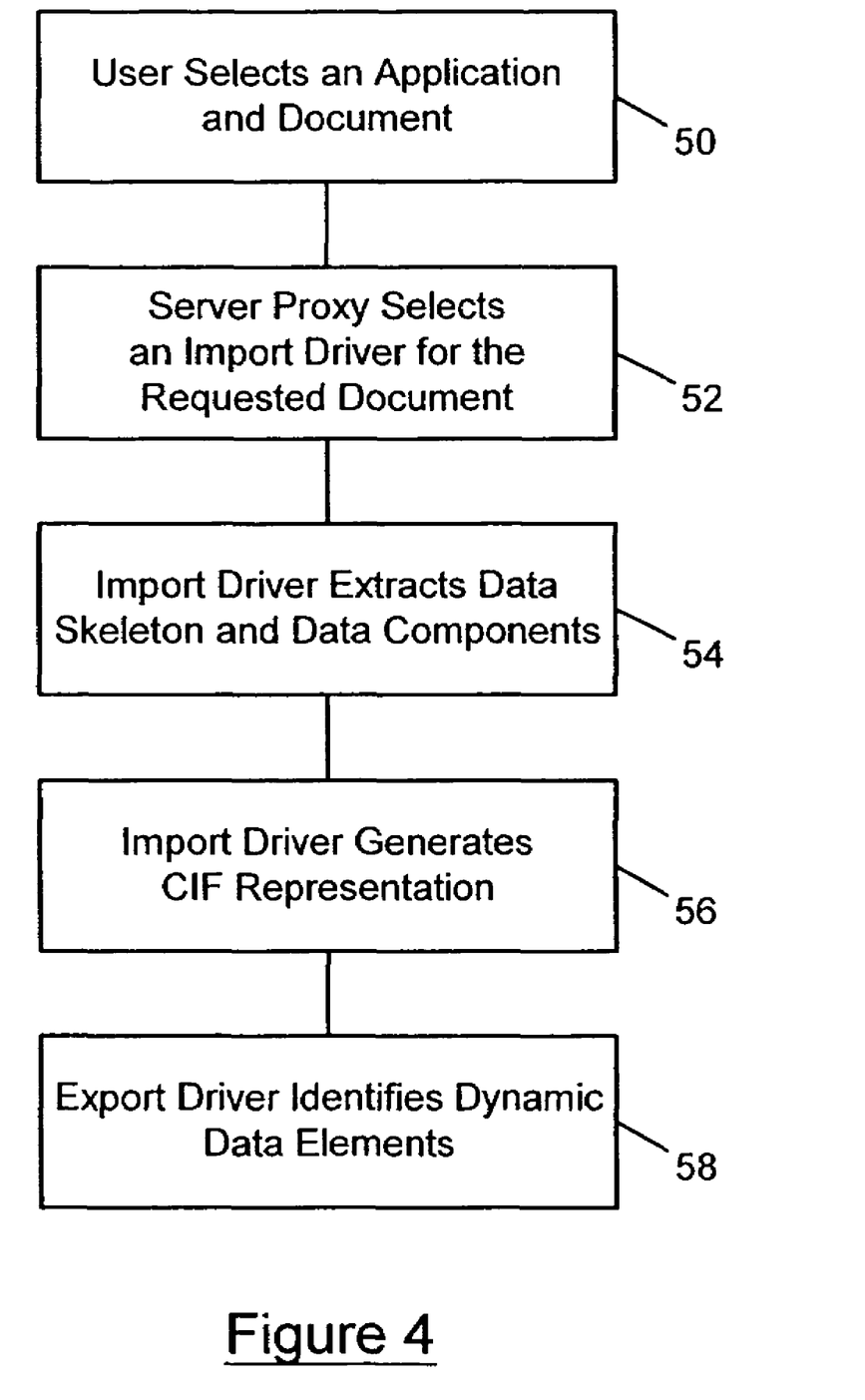
FIG. 4 is a flow diagram of a document parsing sequence.

The adaptation process of the present invention is divided into three stages, as shown in the flow diagram of FIG. 3. First, at step 40, the document requested by the application is parsed in the server to reveal the structure of the document. Second, selected data components of the document are fetched at step 42 by the client at specific fidelity levels. Third, the application is updated with the newly fetched data at step 44. A flow diagram of the step of parsing the requested document is shown in FIG. 4. At step 50, the user first selects an application and a document to be opened under the application. Upon selection by the user of a document, the server proxy 18 at step 52 selects an appropriate import driver 34 for the selected document. The import driver parses the document, extracting its data skeleton and data components (step 54), and generates a CIF representation (step 56). For most applications, as discussed above, the data skeleton is constructed by statically parsing the document at import driver 34, which has direct and fast access to the entire document stored at a data server 20.

In the case of dynamic mechanisms embedded in documents, import driver 34 cannot accurately determine the data components of the data skeleton. Even if the import driver attempted to determine each of the data components as if the import driver were a client executing the application, the determination may not be accurate, as the content may change depending upon variables in or received by application 14. In this case, a dynamic import driver in client proxy 16 intercepts requests for dynamic elements embedded in the retrieved document and recognizes that data may be dynamically added to the retrieved document. If the document is modified in client proxy 16 due to the execution of a dynamic element embedded in the retrieved document, changes to the document are reflected back to the server proxy so that the server proxy is aware of the content and data structure of the retrieved document.

Figure 5:
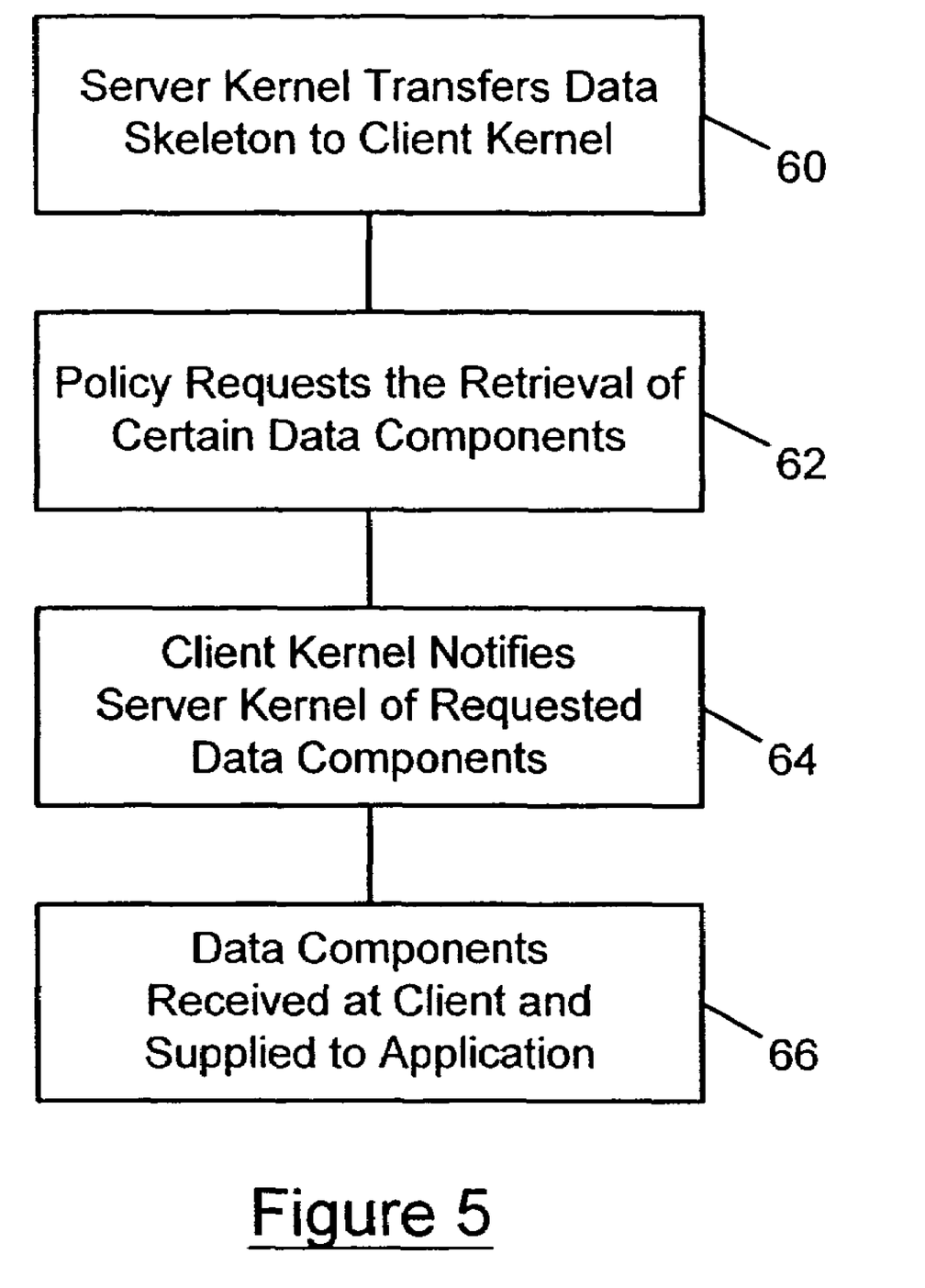
FIG. 5 is a flow diagram of a document fetching sequence.

A flow diagram of the process of document fetching steps are shown in FIG. 5. When the server first retrieves the requested document, server kernel 32 transfers at step 60 the data skeleton to the client kernel without the inclusion of any data components. The policies running on policy element 26 next request at step 62 that client kernel 28 retrieve an identified set of data components, each at a specific fidelity level. At step 64, the client kernel notifies the server kernel of the requested data components. At step 66, the data components are received at the client kernel and supplied to the application 14 as though the retrieved data components are at the highest possible fidelity level and are a complete set of all of the data components of the requested document. The application, believing that the loading of the requested document is complete, returns control to the user.

The client proxy and server proxy, depending on the policy in effect and the user's behavior in the application, may fetch the remainder of the data components of the retrieved document. As an example, in the case of a PowerPoint file, only the first several slides may be transferred to the application. Following this transfer, the client proxy and server server may transfer in the background the remaining slides of the document. As a second example, in the case of an Internet Explorer file, the data components of a page may be transferred to the application in the form of lower fidelity versions of the page. As the user passes the mouse over images of the page, higher fidelity versions of these images are replaced in the file running on the Internet Explorer application.

Figure 6:
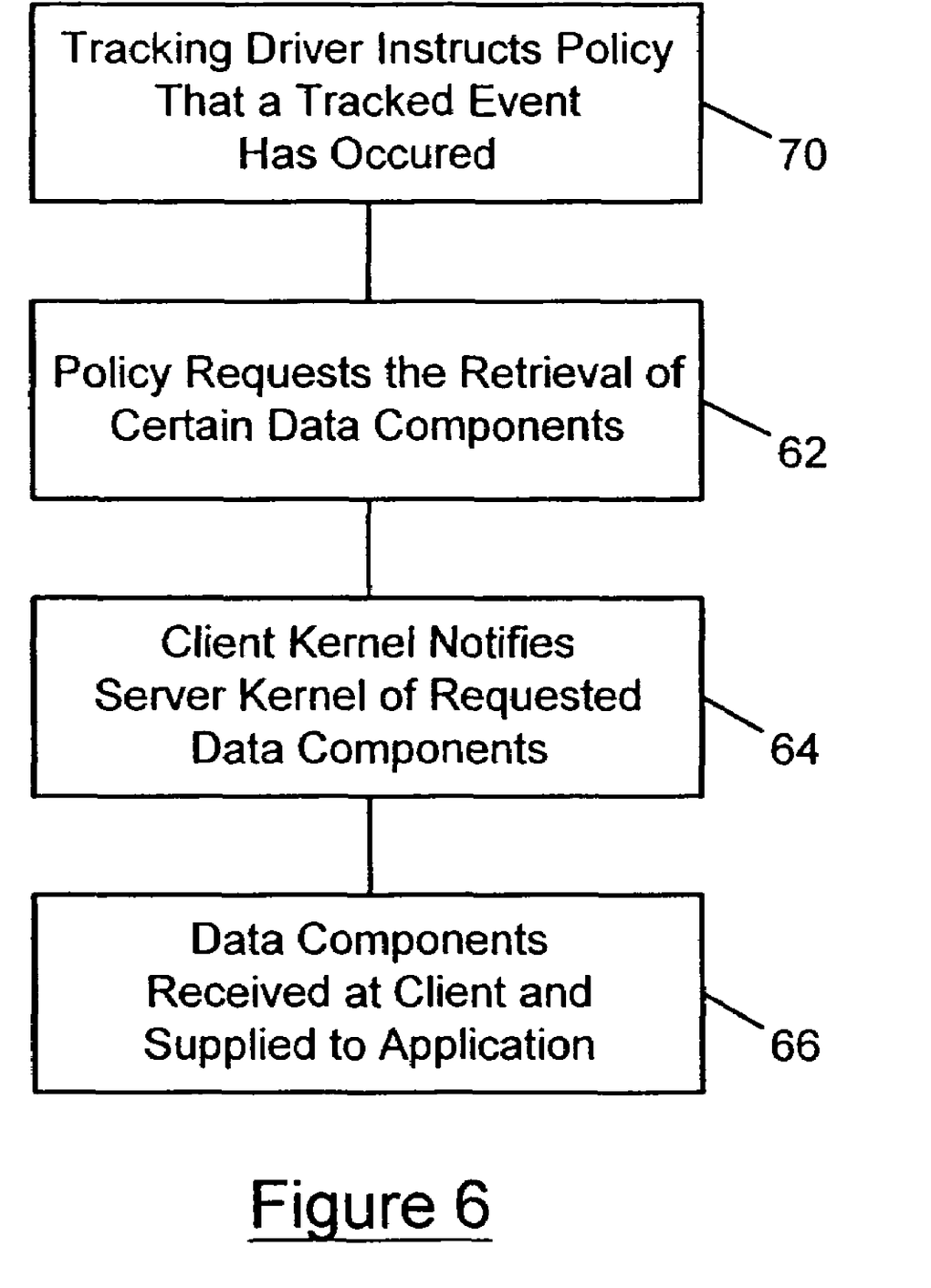
FIG. 6 is a flow diagram of a document updating sequence.

To update the application with new or higher fidelity components, export driver 22 uses the DMI of the application 14 to update the data components of the document of the application. A flow diagram of the process of updating an application with data components using the DMI of an application is shown in FIG. 6. At step 70, tracking driver 34 notifies the policy that a tracked event has occurred. Tracked events may be specific to the application and may include the movement of the mouse over an image or the action of the user scrolling through the document. Once the tracking driver has notified the policy that a tracked event has occurred, the steps performed to update the data component of the application are the same outlined in the flow diagram of FIG. 5. The policy requests that the client kernel retrieve the document (step 62). The client kernel notifies the server kernel of the requested data component (step 64), and the data components are received at the client and supplied to the application (step 66).

At step 66, the step of supplying the data components to the application is done through the DMI of the application, allowing the application to receive an update to data that is being used by the application.

At least two update modalities are used by export driver 22 and mirror the methods by which most applications function. For applications that support a cut-and-paste function (e.g., PowerPoint, Word, Excel), export driver 22 uses a clipboard to insert new data components into the document of the application. For applications that attempt to read and load every data element of the document as a method of acquiring the data element (e.g., Internet Explorer), the proxy asks the application to reload the component being replaced. As an example, if export driver 22 wanted to replace a lower fidelity image in Internet Explorer with a higher fidelity image, export driver 22 would instruct application 14 to reload the image and, following the application's reload instruction, supply application 14 with the higher fidelity image for reloading in the application.

The present invention will support the operation of the application to be adapted in one machine and the client proxy on a different machine. Such an arrangement could be useful, for instance, if the client is a very small device, such as a handheld PDA (Personal Digital Assistant) that cannot support a client proxy. In another embodiment of the present invention, the server proxy and the data server may execute on different machines. Such an arrangement may be desirable, for instance, if the machine on which the data server resides is restricted for security or other reasons. It is also possible that both the client and the server proxy may be located on machines different from the application and the data server, respectively.

Various example adaptation policies were presented. It will be appreciated by those skilled in the art that the present invention provides the infrastructure necessary to enable these and other adaptation policies without modifying the source code of the application or the document on the data server, and that its scope is not restricted to the example policies given. In particular, it will be appreciated that these policies may have a variety of objectives, including but not limited to the objectives of reduction of latency and bandwidth consumption.

Although the present invention has been described in detail, it should be understood that various changes, substitutions, and alterations can be made thereto without departing from the spirit and scope of the invention as defined by the appended claims.

What is claimed is:

1. A method for adapting the operation of application, comprising the steps of:
   receiving at a client machine by the application a variation of a whole version of data following a request by the application for the whole version of the data;
   running at the client machine the application using the variation of the data received by the application;
   updating, using a computer processor at the client machine the data requested by the application, wherein the step of running the application using a variation of the requested data and the step of updating the data requested by the application occur without modification to the source code of the application or the whole version of the data;
   wherein the variation of the data is a version of the data that has a lower fidelity level as compared to the whole version of the data; and
   wherein a user at the client machine can access the variation of the whole version of data during the period that the variation of the whole version of the data is being updated.

2. The method for adapting the operation of an application of claim 1, wherein the variation of the data is a subset of the whole version of the data.

3. The method for adapting the operation of an application of claim 1, wherein the variation of the data is a version of the data that is a subset of the whole version of the data and has a lower fidelity level as compared to the whole version of the data.

4. The method for adapting the operation of an application of claim 1, wherein the step of updating the application comprises the steps of:
   monitoring the application for the occurrence of a tracked event;
   receiving at the application an update of the data requested by the application following the occurrence of a tracked event; and
   supplying the update of the data to the application using a programming interface of the application that permits the dynamic updating of data being operated on by the application.

5. The method for adapting the operation of an application of claim 1, wherein the step of updating the application comprises the steps of:
   monitoring the application for the occurrence of a tracked event;
   receiving at the application an update of the data requested by the application following the occurrence of a tracked event; and
   supplying the update of the data to the application using a programming interface of the application that permits the dynamic updating of data being operated on by the application.

6. A method for adapting the operation of application, comprising the steps of:
   receiving at a client machine by the application a variation of a whole version of data following a request by the application for the whole version of the data;
   running at the client machine the application using the variation of the data received at the application;
   updating, using a computer processor at the client machine, the data requested by the application, wherein the step of running the application using a variation of the requested data and the step of updating the data requested by the application occur without modification to the source code of the application or the whole version of the data; and
   wherein the variation of the data is a subset of the whole version of the data; and
   wherein a user at the client machine can access the variation of the whole version of data during the period that the variation of the whole version of the data is being updated.

7. The method for adapting the operation of an application of claim 6, wherein the variation of the data is a version of the data that is a subset of the whole version of the data and has a lower fidelity level as compared to the whole version of the data.

* * * * *